P. A. SOMMERS.
Band Cutting-Attachments for Thrashing-Machines.

No. 153,987.  Patented Aug. 11, 1874.

Witnesses
James Thurlow
Clarence Thurlow

Peter A. Sommers
by E. Thurlow, his Atty

UNITED STATES PATENT OFFICE.

PETER A. SOMMERS, OF CAZENOVIA, ILLINOIS.

IMPROVEMENT IN BAND-CUTTING ATTACHMENTS FOR THRASHING-MACHINES.

Specification forming part of Letters Patent No. 153,987, dated August 11, 1874; application filed June 2, 1874.

*To all whom it may concern:*

Be it known that I, PETER A. SOMMERS, of Cazenovia, in the county of Woodford, in the State of Illinois, have invented a Band-Cutting Attachment to Thrashing-Machines; and do hereby declare that the following is a full, clear, and exact description thereof, reference being had to the annexed drawings, making a part of this specification, in which like letters of reference refer to like parts, and in which—

Figure 1:
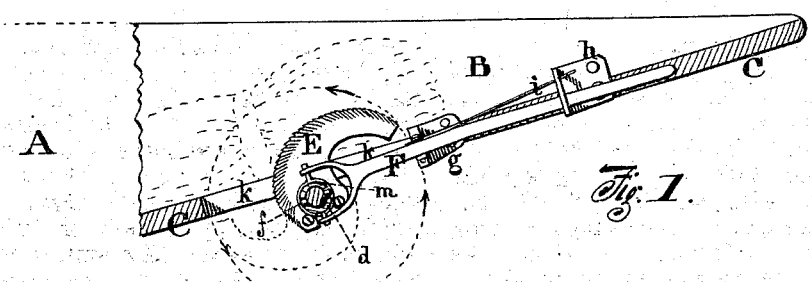
Figure 2:
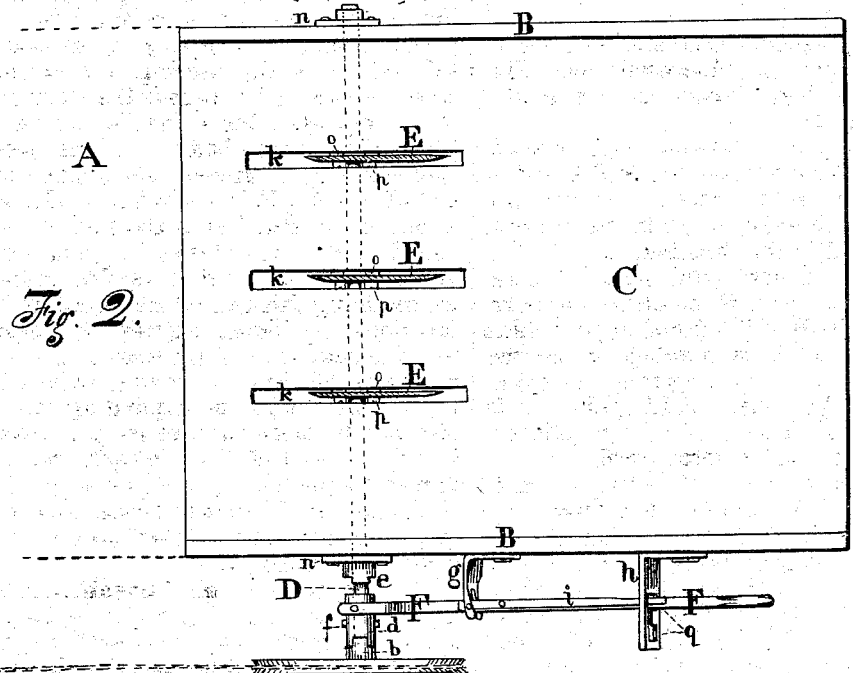
Figure 3:
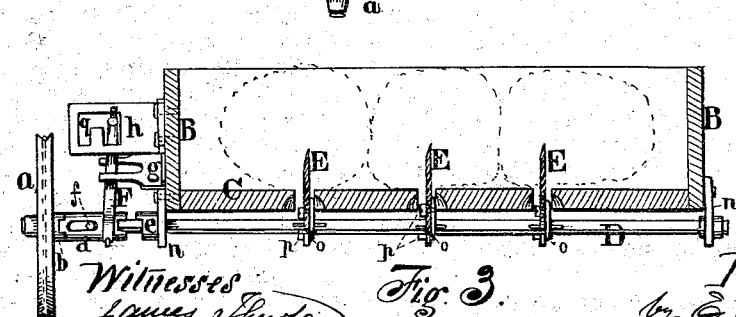

Figure 1 represents a sectional side elevation; Fig. 2, a plan or superficial view; Fig. 3, an end view, partly sectional, across the slots $k$ $k$ $k$, Fig. 2.

This invention is an attachment of a shaft and revolving knives below the feed-board of the machine, for the purpose of severing the bands of the sheaves of grain in passing down said board to the thrasher.

It consists of a horizontal shaft, D, close beneath the feed-board C, mounted on bearings $e$ in the sides B of the thrashing-machine A, and driven by a band-pulley, $a$, on the outer end, and band running from the cylinder-pulley to this one. Said pulley $a$ is made to uncouple from the shaft by a lever, F. The shaft carries several revolving convex sickle-edged knives, E, the edges of which are in the line of a spiral or other expanding curve, so as to rise with a sweeping motion through narrow slots, $k$, in the bottom of said feed-board, and sever the sheaf-bands as they pass along down said board to the cylinder or thrasher below, and are capable of being stopped and thrown out of gear by said lever, so as to remain entirely below the level of said board; the principal objects of this invention being to increase the ease and effectiveness of the operation of cutting the sheaf-bands, and to so construct the knives and the gearing that they must be and remain below the level of the feed-board while uncoupled from the driving-pulley, to place them beyond a chance of doing harm.

I will now give a more detailed description of the invention.

In the drawings, A represents the position of the thrashing-machine; B, the feed-board of same, by which the cut grain is supplied; C, the bottom of the latter, along which the sheaves pass, perforated with several slots, $k$ $k$ $k$, for the passage of the knives E E E; D, the horizontal shaft carrying the knives, and mounted at each end in the bearings $n$ $n$ on each side of the feed-board, and provided with a loose pulley, $a$, and a sliding coupling-sleeve, $d$, connected to the shaft by pins $f$, which pass through slots in the said sleeve; said sleeve being provided with recesses in its ends to slip onto or off a projection on the hub of the pulley, to throw the latter into or out of gear. The coupling of the sleeve $d$ to the collar $e$ of the bearing $n$ is arranged in such a manner as to permit the locking of the shaft only when the knives E are below the surface of the feed-board C. The sleeve $d$ is connected by a groove and collar with the end of a lever, F, in a common mode, and has a fulcrum, $g$, attached to the side of the feed-board, and a detent-plate, $h$, which is provided with a slot with a double recess, $q$ $q$, for retaining this end of the lever F in its two functional positions, assisted by a spring, $i$, to press said lever down to its place. E E E represent the knives, having each a convex edge in the line of an expanding curve, and attached by means of screws $p$ $p$ to a collar, $o$, keyed to the shaft D. I attach one of these knives to the shaft at the distance of every six inches, or about that space, making from three to four or more knives, according to the width of the machine.

The operation of this invention is as follows: The sheaves of grain, in passing down the feed-board C to the thrashing-cylinder, have their bands cut by the sweeping circular motion of the knives E E E set on the shaft D, which is so arranged as to be thrown into or out of gear with its driving-pulley $a$ by means of the lever F and coupling-sleeve $d$. (In the drawings the shaft is represented coupled to the pulley.) When said shaft and knives are thrown out of gear the latter are always at a point below the board C, out of the way, as seen in Fig. 1, an arrangement due to the lug on the collar $e$ of the shaft-bearing $n$, which will only enter a corresponding recess in the sleeve $d$ when said knives are in said position.

What I claim as my invention is—

The within-described band-cutting apparatus, consisting of the knives E, set at one end on the shaft D, and having each a convex edge in the line of an expanding curve, and striking through the slots k in the platform C, the whole operated and controlled by pulley a, sleeve or clutch d, and collar e, as described.

In testimony that I claim the foregoing band-cutting attachment to thrashing-machines, I have hereunto set my hand this 25th day of May, A. D. 1874.

PETER A. SOMMERS.

Witnesses:
 JOHN A. SOMMERS,
 J. E. LOKER.